(12) United States Patent
Hutchinson et al.

(10) Patent No.: US 11,813,776 B2
(45) Date of Patent: Nov. 14, 2023

(54) METHOD FOR REMOVING SUBSTRATE MATERIAL, FOR WASHING, AND FOR DRYING PARTS PRODUCED BY A 3-D PRINTER

(71) Applicant: PostProcess Technologies, Inc., Buffalo, NY (US)

(72) Inventors: Daniel J. Hutchinson, Orchard Park, NY (US); Scott Alexander Gilmour, Amherst, NY (US); Adam Michael Moehlau, Cheektowaga, NY (US); Joshua J. Yagy, Buffalo, NY (US); Joseph M. McMahon, North Tonawanda, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 0 days.

(21) Appl. No.: 17/545,436

(22) Filed: Dec. 8, 2021

(65) Prior Publication Data
US 2022/0097303 A1 Mar. 31, 2022

Related U.S. Application Data

(63) Continuation of application No. 15/984,013, filed on May 18, 2018, now Pat. No. 11,225,023, which is a (Continued)

(51) Int. Cl.
*B29C 64/35* (2017.01)
*B08B 3/00* (2006.01)
(Continued)

(52) U.S. Cl.
CPC ............ *B29C 64/35* (2017.08); *B08B 3/00* (2013.01); *B08B 3/006* (2013.01); *B08B 3/02* (2013.01);
(Continued)

(58) Field of Classification Search
CPC .. B08B 3/00; B08B 3/02; B08B 3/104; B08B 3/024; B08B 3/044; B08B 3/08;
(Continued)

(56) References Cited

U.S. PATENT DOCUMENTS 3,288,109 A 11/1966 Smith, Jr. et al.
3,343,304 A 9/1967 Eppler
(Continued)

FOREIGN PATENT DOCUMENTS

DE 4446587 A1 6/1996
JP H08253109 A 10/1996
(Continued)

OTHER PUBLICATIONS

"'IPad HMI' Makes Car Wash Automation Mobile", InduSoft Web Studio, May 26, 2015, 1 page.
(Continued)

*Primary Examiner* — Yunju Kim
(74) *Attorney, Agent, or Firm* — Lempia Summerfield Katz LLC

(57) ABSTRACT

A method for removing substrate material from a part produced by a 3-D printer. The machine includes a housing having a working chamber defined therein. A spray header is disposed along at least a portion of the perimeter of the working chamber. A pump is configured and arranged to convey a fluid at varying pressures through the spray header. The fluid contacts the part and then flows to the bottom of the working chamber to a fluid outlet.

20 Claims, 7 Drawing Sheets

Related U.S. Application Data continuation of application No. 15/184,709, filed on Jun. 16, 2016, now Pat. No. 10,112,344.

(60) Provisional application No. 62/180,476, filed on Jun. 16, 2015.

(51) Int. Cl.
| | | |
|---|---|---|
| *B08B 3/02* | (2006.01) | |
| *B08B 15/02* | (2006.01) | |
| *B29C 64/20* | (2017.01) | |
| *B33Y 40/20* | (2020.01) | |

(52) U.S. Cl.
CPC ............ *B08B 15/023* (2013.01); *B29C 64/20* (2017.08); *B33Y 40/20* (2020.01)

(58) Field of Classification Search
CPC .... B08B 3/10; B08B 3/12; B08B 3/14; B29C 64/35; B29C 64/40; B33Y 40/00
See application file for complete search history.

(56) References Cited

U.S. PATENT DOCUMENTS

| | | | |
|---|---|---|---|
| 3,807,054 | A | 4/1974 | Joseph |
| 5,335,682 | A | 8/1994 | Yoshimura |
| 5,487,695 | A | 1/1996 | Shank |
| 5,556,324 | A | 9/1996 | Shank, Jr. |
| 5,575,705 | A | 11/1996 | Yam |
| 5,853,489 | A | 12/1998 | Kitazawa |
| 6,109,277 | A | 8/2000 | Linton |
| 6,253,462 | B1 | 7/2001 | Schwarz |
| 9,592,539 | B2 | 3/2017 | Dunn |
| 9,855,589 | B2 | 1/2018 | Dunn |
| 2002/0002987 | A1 | 1/2002 | Jones |
| 2002/0170580 | A1 | 11/2002 | Clifford |
| 2008/0041423 | A1 | 2/2008 | Hardikar |
| 2009/0241997 | A1 | 10/2009 | Tafoya |
| 2009/0321972 | A1 | 12/2009 | Zinniel |
| 2011/0186081 | A1 | 8/2011 | Dunn |
| 2012/0125365 | A1 | 5/2012 | Ike |
| 2012/0273009 | A1 | 11/2012 | Eriksson |
| 2013/0248491 | A1 | 9/2013 | Swanson |
| 2017/0348910 | A1 | 12/2017 | Hutchinson |

FOREIGN PATENT DOCUMENTS

| | | |
|---|---|---|
| JP | 2000127913 A | 5/2000 |
| WO | 2014177823 A1 | 11/2014 |

OTHER PUBLICATIONS

"This drivable car was 3D printed in 44 hours", BI Tech, Mar. 17, 2015, YouTube, https://www.youtube.com/watch?v=WwvwvjNjQaQ.
Model BW1020 General Specifications, Schlyer Machine, Jun. 3, 2013, US.
Model CBW1026 Cage and Bottle Washer, Schlyer Machine, Jun. 7, 2013, US.
Pressure Washer Nozzle Selection Guide, Portland Compressor, Jul. 13, 2014, 1 page.
Techincal Drawing, Model CBW 1026 LH Cage and Bottle Washer, Feb. 28, 2005, US.
Technical Drawing, AS-3000 Wash-Rinse System Overall Views, Apr. 26, 2004.
Technical Drawing, Model BW1020 Bottle Washer, Nov. 8, 2013, US.
Technical Drawing, Model CBW 1026 RH Cage and Bottle Washer, Feb. 28, 2005, US.
Technical Drawing, Model CBW 1026C Cage and Bottle Washer, Feb. 28, 2005, US.
Technical Drawing, Model CBW 1026L LH Cage and Bottle Washer, Feb. 28, 2005, US.
Technical Drawing, Model CBW1026LLS LH Cage and Bottle Washer, Feb. 28, 2005, US.
Technical Drawing, Model CBW1026LS LH Cage and Bottle Washer, Feb. 28, 2005, US.
Technical Drawing, Model CBW1026LS RH Cage and Bottle Washer, Feb. 28, 2005, US.

METHOD FOR REMOVING SUBSTRATE MATERIAL, FOR WASHING, AND FOR DRYING PARTS PRODUCED BY A 3-D PRINTER

CROSS REFERENCE TO RELATED APPLICATIONS

This application is a continuation under 37 C.F.R. § 1.53(b) of U.S. patent application Ser. No. 15/984,013 filed May 18, 2018, now U.S. Pat. No. 11,225,023, which is a continuation under 37 C.F.R. § 1.53(b) of U.S. patent application Ser. No. 15/184,709 filed Jun. 16, 2016, now U.S. Pat. No. 10,112,344, which claims priority benefit of U.S. Provisional Patent Application No. 62/180,476 filed Jun. 16, 2015, the entire disclosures of which are incorporated by reference in their entirety and relied upon.

TECHNICAL FIELD

The present invention relates generally to the field of 3-D printers, and more particularly to a method for removing substrate material from parts formed by 3-D printers.

BACKGROUND ART

A part produced by a 3-D printer may include a scaffolding and/or substrate attached to the part after the printing process is completed. A finishing process may be required to remove the scaffolding/substrate from the part. Also, parts produced by a 3-D printer may need to be washed and dried.

BRIEF SUMMARY OF THE INVENTION

With parenthetical reference to corresponding parts, portions or surfaces of the disclosed embodiment, merely for the purposes of illustration and not by way of limitation, the present invention provides an improved machine (10) for processing a part produced by a 3-D printer. The machine (10) includes a housing (13) having a working chamber (16) defined therein.

A support structure (19) disposed at the bottom of the working chamber (16) supports the 3-D printed part. The structure (19) has at least one opening defined therein. A spray header (31) is disposed along at least a portion of the perimeter of the working chamber (16). A pump (60) is configured and arranged to convey a fluid at varying pressures through the spray header (31). The fluid from the spray header (31) contacts the part and then passes through the opening in the structure (19) where it flows into a sump (45) below the working chamber (16) which has a fluid outlet (47).

The spray header (31) may comprise an assembly of vertical and horizontal tubes (34, 37) having apertures defined therein.

The spray header (31) may be disposed around the perimeter of the working chamber (16).

The spray header (31) may oscillate inside the working chamber in the Z-axis direction.

The machine (10) may also include a heater (65) having heating elements or a coil for heating the fluids conveyed into the working chamber (16) through the spray header (31). The heater (65) may heat the fluid to a temperature up to about 180 degrees Fahrenheit.

The machine (10) may further comprise a dryer for drying the part.

A portion of the spray header (31) may be disposed beneath the support structure (19) to provide for spraying fluid onto the bottom surface of the part. The support structure (19) may have an open lattice-type structure.

The pump (60) may be configured to convey fluids at a variety of pressures from low pressure range from zero to 15 psi up to about 60 psi.

The pump (60) may be connected to one or more fluid circuits for conveying fluids to the working chamber (16). One of the fluid circuits may be configured and arranged for conveying washing fluids. The same circuit may also convey rinsing fluids or there may be a second fluid circuit for conveying rinsing fluids. The fluids may be provided through connections to existing hot and cold tap water lines.

The machine (10) may also include a device for injecting chemicals into the working chamber (16).

The present invention also provides a method of processing a part produced by a 3-D printer. The method includes providing a housing (13) having a working chamber (16) defined therein. In another step, the method includes providing a support structure (19) disposed at the bottom of the working chamber (16) for supporting the part. The structure (19) may have at least one opening defined therein. Next, the method provides at least one spray header (31) disposed along at least a portion of the perimeter of the working chamber (16). Also, the method includes providing a pump (60) configured and arranged to convey a fluid at varying pressures through the spray header (31).

Next, in a further step, a part is inserted into the working chamber (16). An ultrasonic agitator may be included in the working chamber to assist in removal of debris.

Next, washing fluid is conveyed through the at least one spray header (31) into the working chamber (16).

Also, the method includes conveying rinsing fluid through the at least one spray header (31) into the working chamber (16).

And the method may include filtering fluid from the outlet of the working chamber (16) to remove debris and conveying the filtered fluid to the intake for the pump (60).

DESCRIPTION OF THE EMBODIMENT

Figure 1:
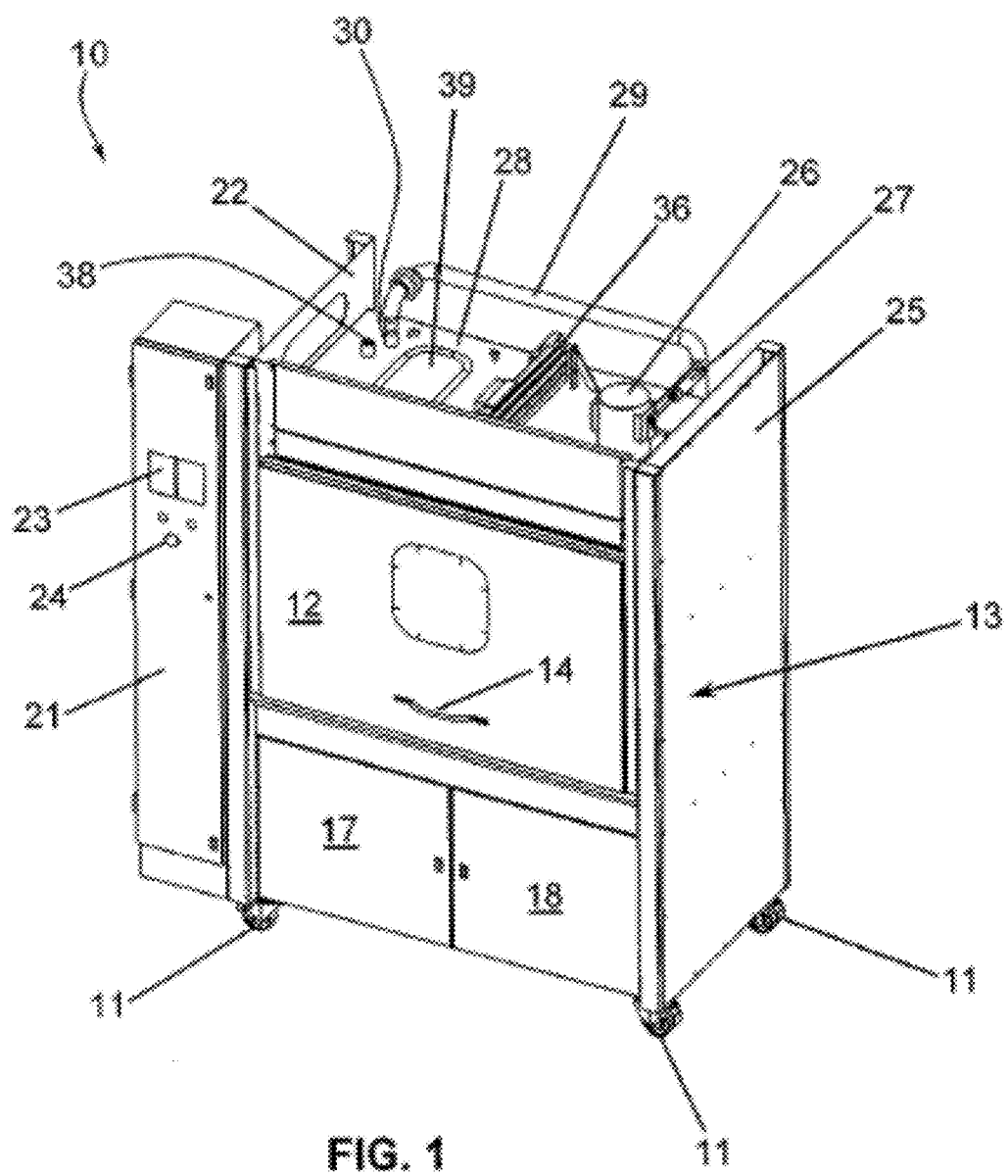
FIG. 1 is a front perspective view of a machine for removing substrate material, for washing, and for drying parts produced by a 3-D printer.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 2:
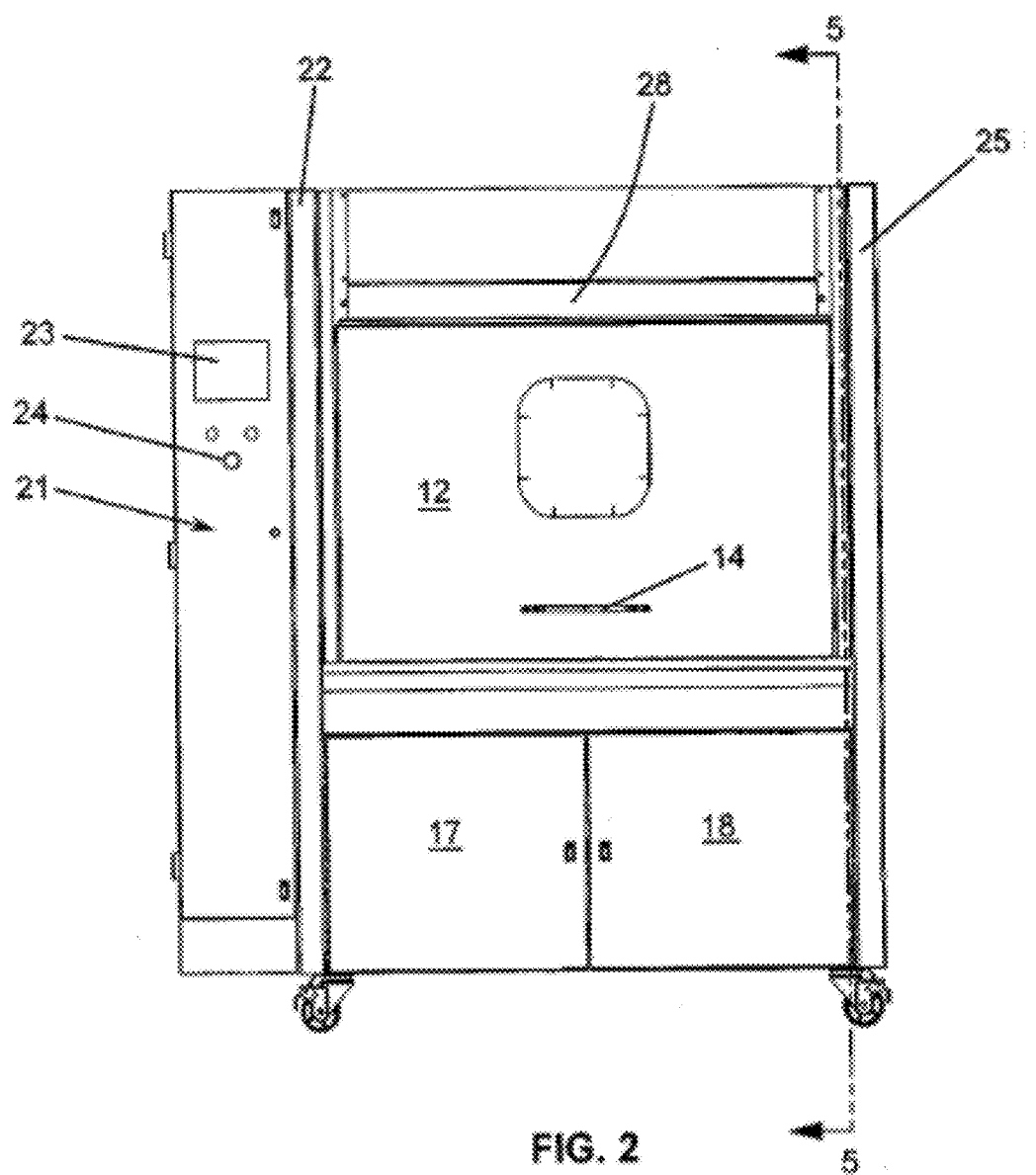
FIG. 2 is a front elevational view of the machine.

Referring to FIGS. 1-7 and initially to FIGS. 1-2, a part produced by a 3-D printer may include a scaffolding and/or substrate attached to the part after the printing process is completed. A finishing process may be required to remove the scaffolding/substrate from the part. Also, parts produced by a 3-D printer may need to be washed and dried. The present invention provides a machine 10 with a housing 13. The machine 10 may be mounted on casters 11 for movement about a support surface. The front of the machine 10 may be provided with a vertically oriented sliding door 12 with a handle 14. As an alternative, a hinged door may be provided. The front of the machine 10 may also be provided with a pair of access doors 17, 18 located beneath the vertical door 12. An electronic enclosure 21 may be located on the left hand side of the machine and may contain electronics and processors for controlling the operation of the machine 10. The electronics may include a programmable logic controller (PLC). The electronic system includes a touch screen display 23 with programmable cycles including programmable startup/shutdown sequencing and time and an emergency stop button 24. The system may also include a status printer. The control system may also include transmitters and receivers for remote connectivity with building automation systems or the like. The housing 13 has a pair of upstanding side members 22 and 25. A top member 28 encloses the top of the housing 13 and provides for mounting fittings for pipes and the spray header drive 36 to the housing 13. The interior of the housing 13 may be illuminated by a light source (not shown). Inlet 30 provides for connection to a conduit 29 that is in fluid communication with the outlet of the pump 60 as described in greater detail herein. A clear window 39 provides for visual inspection of the inside of the working chamber 16. An adjustable exhaust air damper 26 is also provided at the top of the machine and may be actuated to open and close by a rodless cylinder 27.

Figure 3:
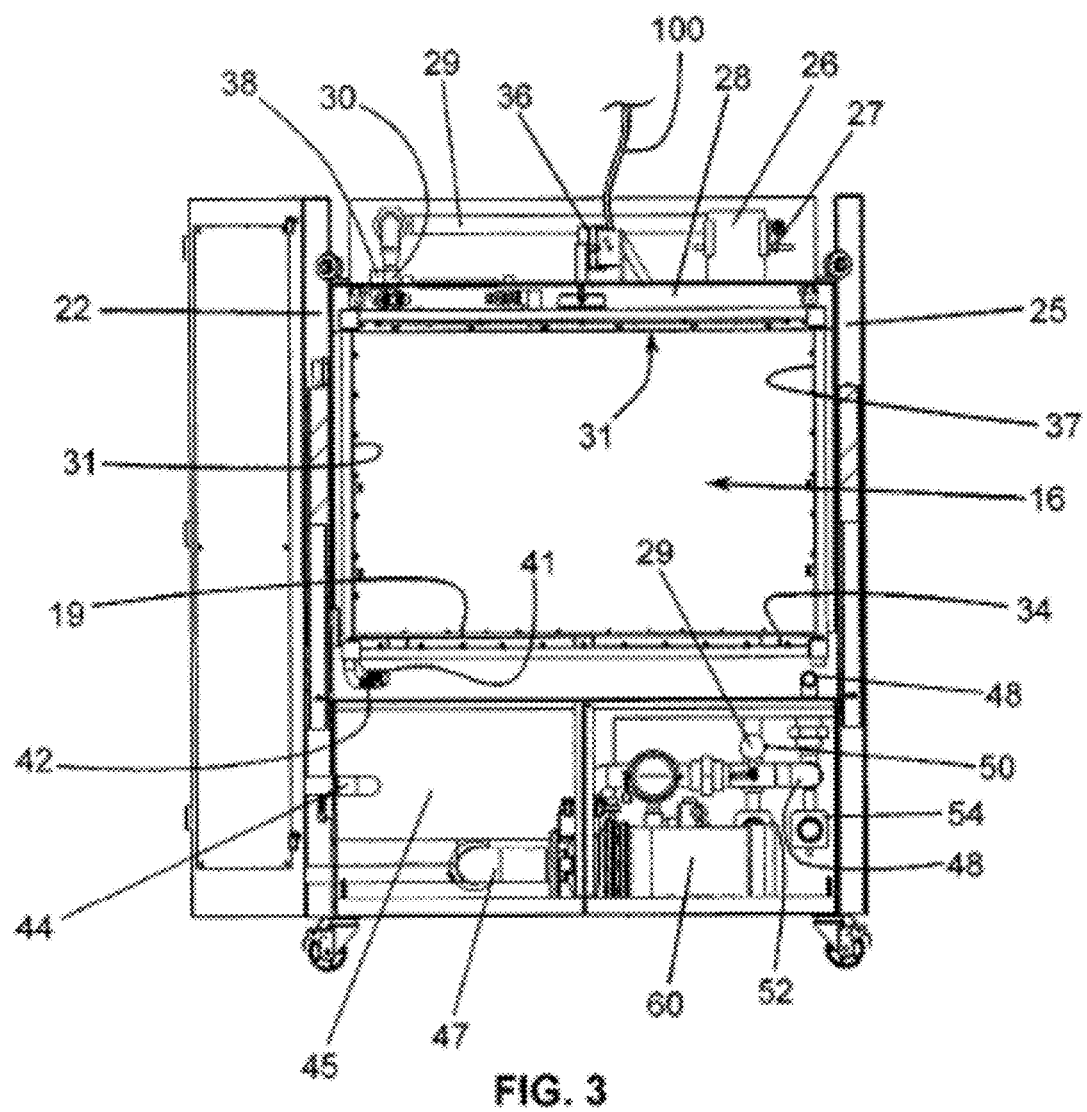
FIG. 3 is a front elevational view of the machine with the front doors and covers removed.

In FIG. 3 an opening or working chamber 16 is located in a midportion of the housing 13. The chamber 16 is bordered at the bottom by a support structure 19. The support structure 19 may be formed by a plurality of members arranged to form an open lattice type structure, or similar structure for drainage. The support structure 19 supports the part being washed and allows fluid and debris to pass through the support structure 19 to a sump 45 below. The chamber 16 is bordered by sidewalls 22, 25 that are spaced apart from each other. The sidewalls 22, 25 are connected by the top wall 28 extending therebetween. A spray header 31 is configured and arranged to extend around the perimeter of the chamber 16. Fluid passes through the chamber 16 to a sump 45 disposed below the chamber 16. The sump 45 has a tube 44 for inserting a level probe. The fluid exits the sump 45 through conduit 47 which is connected to the intake of the pump 60. From the pump 60, fluid is conveyed through conduit 48 to the bottom of the chamber 16, and fluid is conveyed through conduit 29 to the top of the unit. A pressure gauge 50 may be provided to monitor the output pressure of the pump 60. Actuators 52 and 54 control valves disposed in conduits 29 and 48 respectively.

Conduit 48 may be connected to the lower inlet 41 of the spray header 31. Another lower inlet 42 is provided for connection to a water supply or tap water line. Conduit 29 is connected to upper inlet 30 for the spray header 31. Upper inlet 38 may be connected to a water supply or tap water line.

Figure 4:
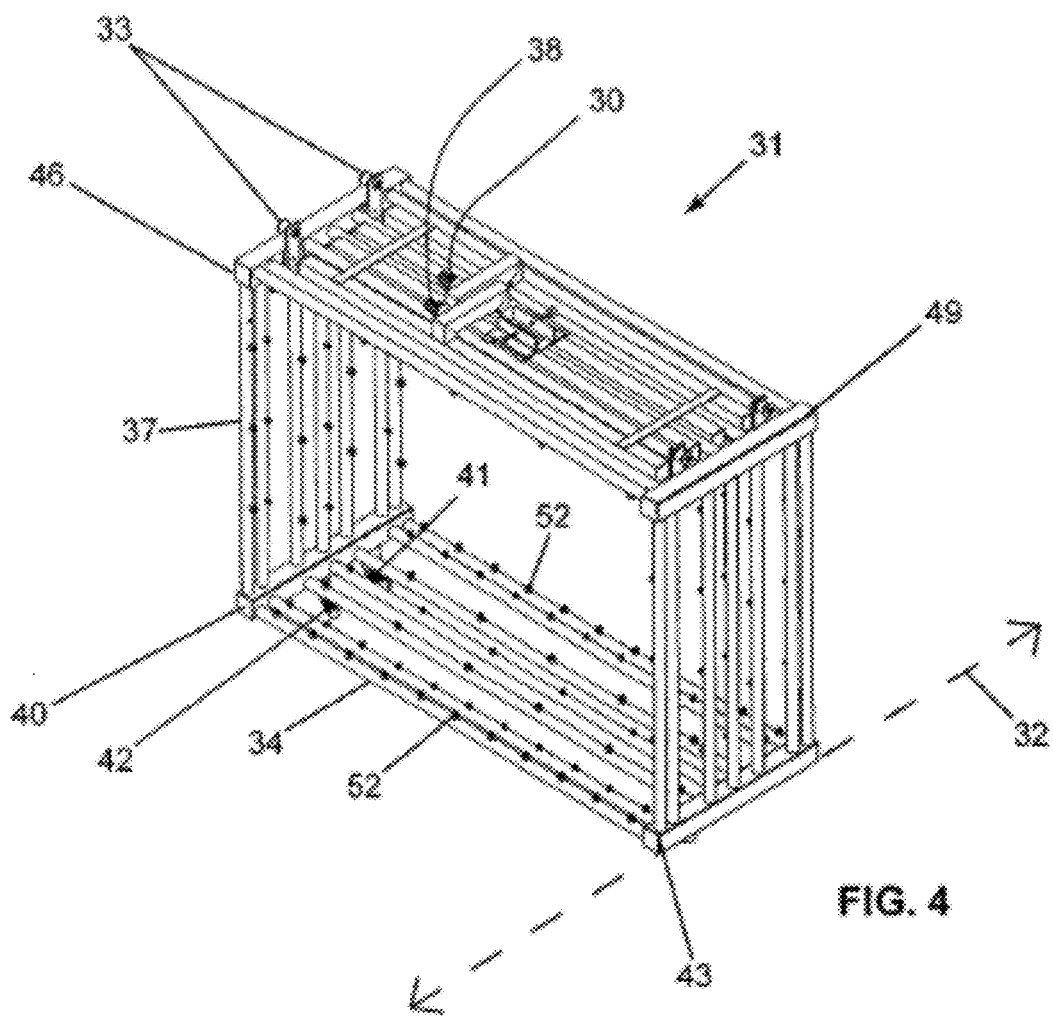
FIG. 4 is a perspective view of a spray header.

Turning to FIG. 4, the spray header 31 may be mounted on a roller carriage 33 for oscillation in the X-axis direction indicated by arrow 32. The spray header 31 may be activated and moved in oscillating fashion pneumatically by means of a spray header drive 36 (FIG. 3) connected to a supply of compressed air 100 (FIG. 3). Other means for causing the spray header 31 to oscillate will be evident to those of ordinary skill in the art based on this disclosure. The spray header 31 may be formed with two or more separate circuits within the header assembly to provide for conveying fluids at different pressures to the working chamber 16. In the example shown, the top of the header 31 receives low pressure fluid and the bottom of the header 31 receivers higher pressure fluid. The pressure of the fluid may be adjusted by varying the size of the nozzles in the individual circuits within the spray header 31.

Figure 5:
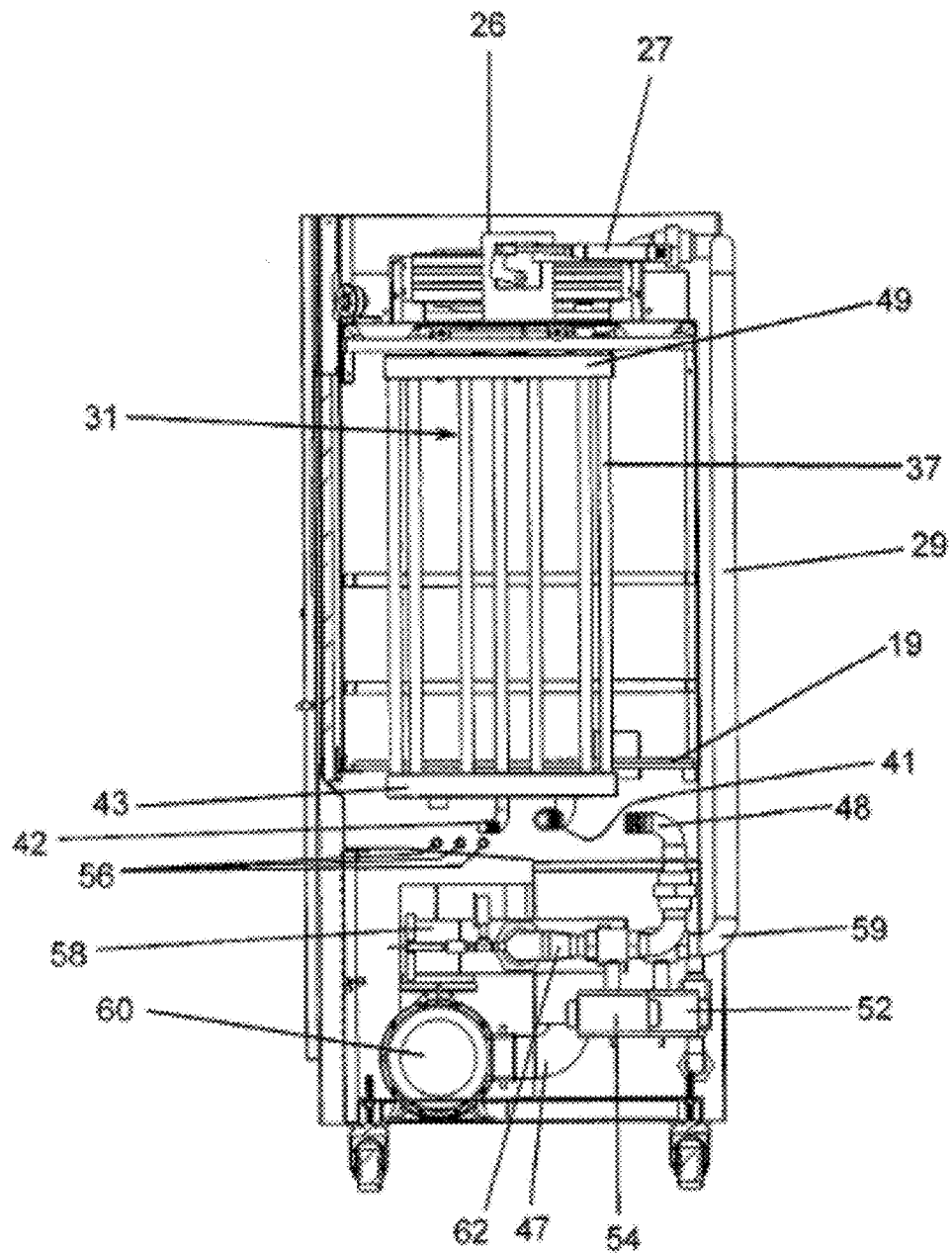
FIG. 5 is a cross-sectional view taken along lines 5-5 of FIG. 2.
Figure 6:
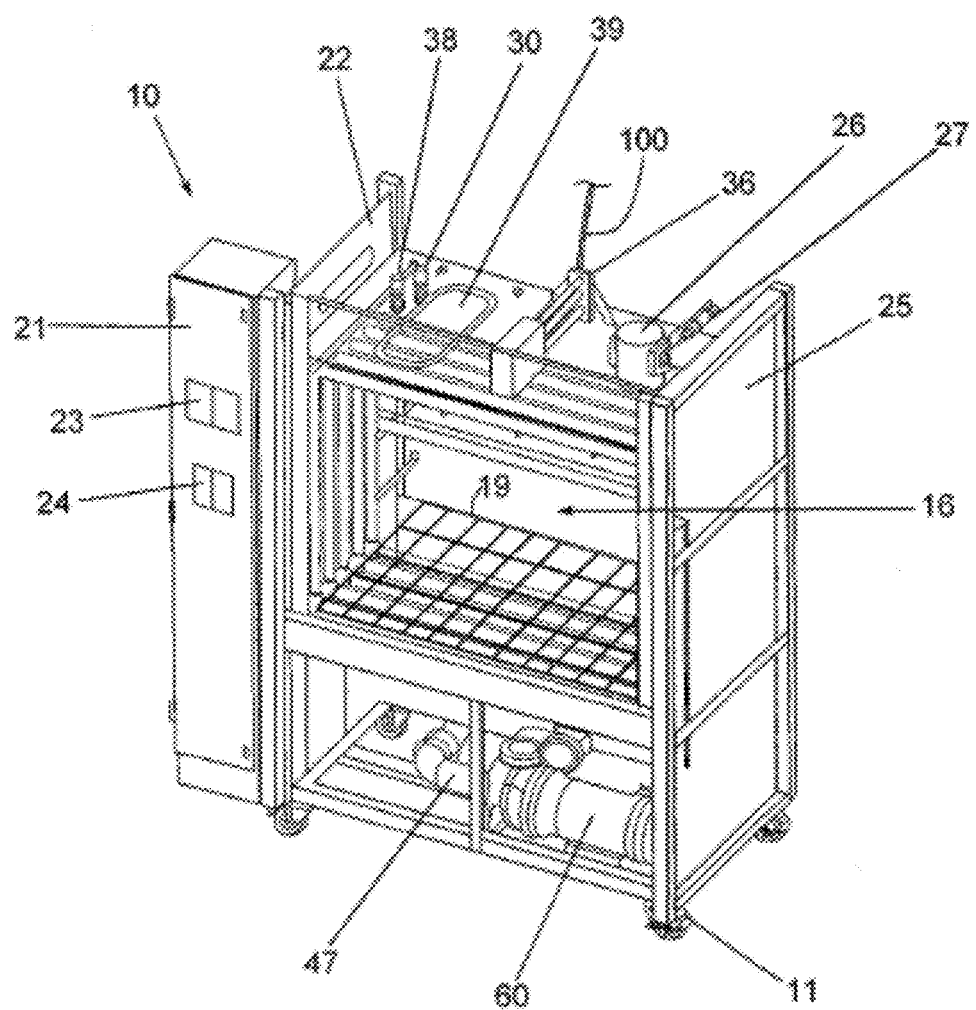
FIG. 6 is a front perspective view of the machine with the doors and covers removed; and, FIG. 7 is a rear perspective view of the machine with the cover removed.

As best shown in FIG. 5, the lower portion of the spray header 31 may be disposed beneath the support structure 19 so that the bottom surface of the part can be sprayed from underneath as it is supported by the support structure 19.

The spray header 31 may include a frame comprised of a plurality of horizontal tubes 34 and a plurality of vertical tubes 37 connected by four header bars 40, 43, 46, 49 to form a generally rectangular structure. Other shapes may also be suitable. Each of the tubes 34 and 37 has a plurality of outlet nozzles 52 defined therein. The tubes 34, 37 and header bars 40, 43, 46, and 49 form a network of fluid conduits for distributing four different fluids. There may be one or more conduits for delivery of the fluids. The high pressure and low pressure wash fluids and the high pressure and low pressure rinse fluids may be conveyed through dedicated circuits or through a common fluid circuit by means of valves.

Figure 7:
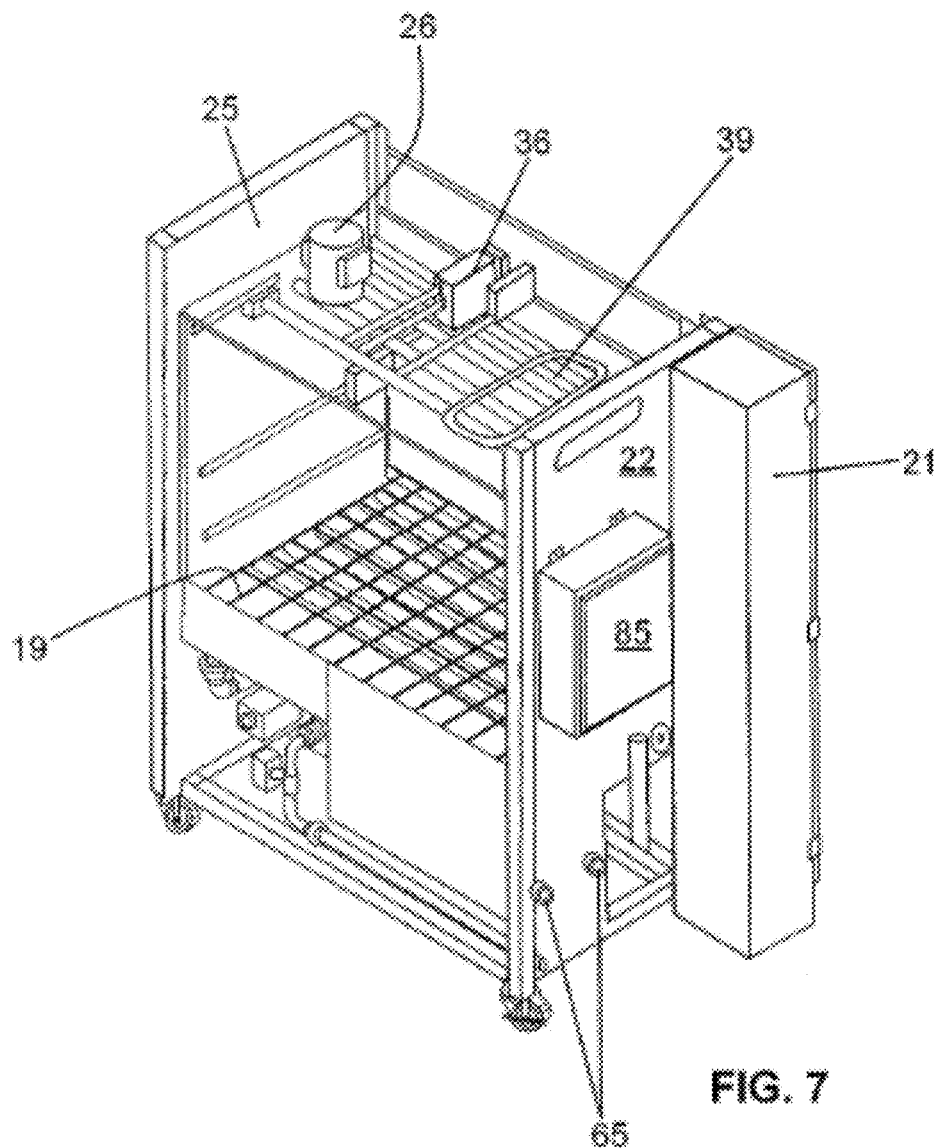

Returning to FIG. 3, the tubes 34 and 37 may contain different circuits for flow of fluids through the system. One of the circuits may contain flow paths for high and low pressure washing cycles. The washing fluid may comprise a mixture of water and chemicals with different ph values, cleaning solution, or the like depending on the material that the part is manufactured from. The washing fluid may be acidic or alkaline as will be evident to those of ordinary skill in the art based on this disclosure. For example, the washing fluid may be heated to a temperature up to approximately 180 degrees F. by an electric heating element 65 (FIG. 7). The washing fluid may be conveyed at varying pressures by a pump 60 (FIG. 5) configured and arranged for variable pressure pumping action. The low pressure range may range from about zero to 15 psi, and the high pressure range may range from about 15 psi to about 60 psi. In the high pressure cycle, the washing fluid is directed into the part from all directions by the spray header 31 to mechanically remove any remnants from the part. In the low pressure cycle, the washing fluid may be delivered at low pressure, or even very low pressure such as a drizzle, to the part to allow the chemical ingredients of the washing fluid to soak and remain in contact with the part for a longer time period. The fluid pressure may also be varied through different size nozzles in the spray header tubes. In addition, to the washing circuits, there may be rinse circuits that provide a passageway for fluids to rinse the part. The rinse fluids may be provided by direct connection to hot and cold water plumbing lines supplied from the plant water supply such as incoming utility water lines. The rinse fluid (e.g. water) may be conveyed at high or low pressure by means of nozzles connected to different flow paths. As an alternative, the wash and rinse fluids may be conveyed through the same flow circuit with the use of different valves. The electric heating element 65 (FIG. 7) may be used for heating the washing fluid to user specified temperatures up to and including approximately 180 degrees F. and to maintain the temperature throughout the wash cycle. The part may be dried by recirculating drying air through the chamber 16 either alone or in connection with a heat exchanger.

In operation, the door 12 (FIG. 1), which may be a guillotine type door, is opened and a part produced by a 3-D printer is inserted for washing, drying, and/or removal of a substrate/scaffold. The door 12 is closed and a wash/rinse cycle is initiated via a computer control system located inside enclosure 21. The control system provides for customizable wash, rinse and heated drying cycles. The control system includes a PLC controller with a HMI touchscreen. The system receives input from pressure, temperature and ph sensors located in the apparatus. The part may be subject to numerous cycles including high pressure washing, low pressure washing, high pressure rinsing, low pressure rinsing, and ultrasonic agitation. The wash cycles may all include a high temperature washing fluid containing chemicals for removing/dissolving the substrate. The control system may also include a wired or wireless remote connection to a building automation system for remote control of the machine.

Turning to FIG. 5, the support structure 19 is shown at the bottom of the chamber 16. The system may include injection ports 56 for injection of chemicals, additives or the like into the chamber 16 for various purposes such as control of the ph of the system or the like. The system may also include a dual frequency ultrasonic agitation system 85 (FIG. 7). Also, the system may be provided with a light for illuminating the interior of the machine. The system may include a high pressure wash circuit (powered by the pump 60). The system may also include a high pressure fresh water rinse circuit (provided by connection to plant tap water supply provided which may be provided by a utility and pressure adjusted by nozzles). The system may also include a low pressure wash circuit (powered by the pump 60) and a low pressure fresh water rinse circuit (provided by connection to plant tap water supply which may be provided by a utility and pressure adjusted by nozzles). The system may also include the following features: oscillating spray header; chemical injection (acid, alkaline, neutralization); automatic PH control; electrically powered heating elements; user programmable cycles (time, pressure, PH, amount of soap, temperature, descale, drain); dual frequency ultrasonic agitation; status printer; touch screen HMI; safety features such as emergency stop button; guide bars; magnetic door switches, load grid, and the like. The machine may also be provided with swivel casters with a brake. Additional features include: 6" exhaust; incoming ¾" hot water feed; incoming ¾" cold water feed; 208/230V/60 HZ/3 PH OR 220V 2 PH 60 amp service; and 1.5" drain line. The system may include a self-flushing debris strainer 58 (FIG. 5) and a two-stage filtering mechanism in fluid communication with the outlet of the chamber 16. The system may also include an adjustable exhaust air damper 26; a roller carriage for the header drive assembly; submersion tumbling; submersion shelving system; auto-drain; and auto-fill.

Therefore, while the presently-preferred form of machine has been shown and described, and several modifications discussed, persons skilled in this art will readily appreciate that various additional changes may be made without departing from the scope of the invention.

What is claimed is:

1. A method of processing a part produced by a 3-D printer to remove substrate material therefrom with a machine that includes a working chamber, a support structure located at a bottom of the working chamber, and spray nozzles located around the support structure, the method comprising:

inserting the part produced by the 3-D printer onto the support structure; and operating the spray nozzles to cause the part produced by the 3-D printer on the support structure to be sprayed by a cleaning solution from above and below, whereby the substrate material is removed from the part produced by the 3-D printer; and wherein the cleaning solution contacts the part and then passes through at least one opening in the support structure where it flows to the bottom of the working chamber to a fluid outlet.

2. The method of claim 1, wherein the working chamber has a door that provides access thereto, further comprising:

prior to the step of inserting the part produced by the 3-D printer onto the support structure, opening the door; and after the step of inserting the part produced by the 3-D printer onto the support structure, closing the door.

3. The method of claim 1 further comprising:

heating the cleaning solution.

4. The method of claim 3 wherein the heating step further comprises:

heating the cleaning solution to approximately 180 Fahrenheit.

5. The method of claim 1 further comprising:

oscillating the spray nozzles.

6. The method of claim 5 wherein the oscillating step further comprises:

oscillating the spray nozzles in the X-direction.

7. The method of claim 1 further comprising:

collecting the cleaning solution at the bottom of the working chamber; and pumping the cleaning solution collected at the bottom the working chamber to the spray nozzles.

8. The method of claim 7 further comprising:

prior to the step of pumping the cleaning solution collected at the bottom of the working chamber to the spray nozzles, filtering the cleaning solution.

9. The method of claim 1 wherein the step of operating the spray nozzles further comprises:

directing the cleaning solution at the part produced by the 3-D printer at a pressure of between 15 psi to 60 psi to mechanically remove remnants of the substrate material therefrom.

10. The method of claim 1 wherein the step of operating the spray nozzles further comprises:

directing the cleaning solution at the part produced by the 3-D printer at low pressure in the range of zero to 15 psi.

11. The method of claim 1 wherein the step of operating the spray nozzles further comprises:

drizzling the cleaning solution at the part produced by the 3-D printer to soak the part produced by the 3-D printer.

12. The method of claim 1 further comprising:
after operating the spray nozzles to cause the part produced by the 3-D printer on the support structure to be sprayed by the cleaning solution to remove substrate material therefrom, rinsing the part produced by the 3-D printer with water.

13. The method of claim 1 wherein the support structure has openings therein, and wherein the step of operating the spray nozzles to cause the part produced by the 3-D printer to be sprayed by the cleaning solution from above and below, further comprises:
spraying the part produced by the 3-D printer on the support structure from below through the openings in the support structure.

14. The method of claim 1 wherein the cleaning solution has chemical properties suitable for dissolving at least a portion of the substrate material and wherein the method further comprises:
dissolving at least a portion of the substrate material.

15. The method of claim 1 further comprising:
illuminating the working chamber.

16. The method of claim 1 further comprising:
exhausting air from the working chamber via an exhaust damper located at a top thereof.

17. A method of removing substrate material from a part produced by a 3-D printer, the method comprising:
inserting the part produced by the 3-D printer onto a support structure located at a bottom of a working chamber; and
spraying cleaning solution onto the part produced by the 3-D printer from spray nozzles located above and below the support structure, whereby the substrate material is removed from the part produced by the 3-D printer; and
wherein the cleaning solution contacts the part and then passes through at least one opening in the support structure where it flows to the bottom of the working chamber to a fluid outlet.

18. The method of claim 17 wherein the step of spraying the cleaning solution onto the part produced by the 3-D printer from the spray nozzles located above and below the support structure further comprises:
spraying the part produced by the 3-D printer on the support structure from below through one of the at least one opening in the support structure.

19. A method of removing substrate material from a part produced by a 3-D printer, the method comprising:
inserting the part produced by the 3-D printer onto a support structure located at a bottom of a working chamber;
spraying a cleaning solution onto the part produced by the 3-D printer from a spray nozzle located above the support structure;
spraying the cleaning solution onto the part produced by the 3-D printer from a spray nozzle located below the support structure;
whereby the substrate material is removed from the part produced by the 3-D printer; and
wherein the cleaning solution contacts the part and then passes through at least one opening in the support structure where it flows to the bottom of the working chamber to a fluid outlet.

20. The method of claim 19 wherein the step of spraying the cleaning solution onto the part produced by the 3-D printer from the spray nozzle located below the support structure further comprises:
spraying the part produced by the 3-D printer on the support structure from the spray nozzle located below the support structure through one of the at least one opening therein.

* * * * *